(12) United States Patent
Liu et al.

(10) Patent No.: US 9,279,042 B2
(45) Date of Patent: Mar. 8, 2016

(54) METHOD OF THE PRODUCTION OF A ROOFING ASPHALT COMPOSITION USING CATALYTIC OXIDATION

(71) Applicant: BITUMAR INC., Montreal East (CA)

(72) Inventors: Hua Qin Liu, Pointe-Claire (CA); Vu Q. Nguyen, Arnold, MD (US); Rene Dufresne, Montreal (CA)

(73) Assignee: Bitumar Inc., Montreal East, Quebec (CA)

( * ) Notice: Subject to any disclaimer, the term of this patent is extended or adjusted under 35 U.S.C. 154(b) by 0 days.

(21) Appl. No.: 14/329,275

(22) Filed: Jul. 11, 2014

(65) Prior Publication Data

US 2016/0009894 A1    Jan. 14, 2016

(51) Int. Cl.
 *C08L 95/00*  (2006.01)
 *C08J 11/16*  (2006.01)

(52) U.S. Cl.
 CPC .............. *C08J 11/16* (2013.01); *C08L 95/00* (2013.01); *C08J 2307/00* (2013.01); *C08J 2321/00* (2013.01)

(58) Field of Classification Search
 CPC .... C08J 11/16; C08J 2321/00; C08J 2307/00; C08L 95/00
 USPC .......................................................... 524/71
 See application file for complete search history.

(56) References Cited

U.S. PATENT DOCUMENTS

| | | | |
|---|---|---|---|
| 1,782,186 A | 11/1930 | Abson | |
| 2,375,117 A | 5/1945 | Lentz | |
| 2,450,756 A | 10/1948 | Hoiberg | |
| 2,522,069 A * | 9/1950 | Staten et al. | 521/41 |
| 2,649,584 A | 8/1953 | Chappell | |
| 3,873,483 A | 3/1975 | Oelsner et al. | |
| 4,069,181 A | 1/1978 | Healy et al. | |
| 4,129,542 A | 12/1978 | Matheson et al. | |
| 4,738,997 A | 4/1988 | Lundberg et al. | |
| 5,501,730 A * | 3/1996 | Duong et al. | 106/281.1 |
| 6,414,056 B1 | 7/2002 | Puzic et al. | |
| 7,981,517 B2 | 7/2011 | Walther et al. | |
| 8,206,817 B2 | 6/2012 | Donovan et al. | |
| 8,277,882 B2 | 10/2012 | Smith et al. | |
| 8,435,639 B2 | 5/2013 | Rokowski et al. | |
| 8,476,360 B2 | 7/2013 | Tse et al. | |
| 8,551,619 B2 | 10/2013 | Viasnoff et al. | |
| 2006/0243163 A1 | 11/2006 | Martin | |
| 2006/0249049 A1 * | 11/2006 | Martin | 106/273.1 |
| 2011/0146531 A1 | 6/2011 | Mitra | |
| 2011/0197785 A1 | 8/2011 | Trumbore et al. | |
| 2013/0017368 A1 | 1/2013 | Zhou | |

FOREIGN PATENT DOCUMENTS

| | | |
|---|---|---|
| EP | 0093500 A1 | 5/1982 |
| EP | 0053041 A2 | 6/1982 |
| EP | 0338336 A1 | 10/1989 |
| EP | 0775719 A2 | 5/1997 |

* cited by examiner

*Primary Examiner* — Hui Chin
(74) *Attorney, Agent, or Firm* — Philip C. Mendes da Costa; Bereskin & Parr LLP/S.E.N.C.R.L., s.r.l.

(57) ABSTRACT

A catalytic process for preparing a roofing asphalt composition comprising an oxidized blend of a paving grade asphalt and recycled rubber is described herein.

22 Claims, 2 Drawing Sheets

METHOD OF THE PRODUCTION OF A ROOFING ASPHALT COMPOSITION USING CATALYTIC OXIDATION

FIELD

The present disclosure broadly relates to a roofing asphalt composition. More specifically, the present disclosure relates to a roofing asphalt composition prepared from paving grade asphalt and a method for the preparation of same.

BACKGROUND

The following is not an admission that anything discussed below is part of the prior art or part of the common general knowledge of a person skilled in the art.

There are many applications for bitumen (which can also be referred to as asphalt). For example, asphalt may be used for waterproofing products or articles, such as roofs, buildings, boats, shingles, roofing felts, roofing sheets or roofing membranes, as well as for paving roads.

Asphalt shingles are generally the primary roofing materials for residential graded roofs. Asphalt shingles may comprise either organic felt materials or glass fiber reinforcing mats which are saturated or encapsulated with bitumen or asphalt to make them waterproof. In general, asphalt shingles are for steep slope roofing whereas modified bitumen membranes are for low slope roofing.

Asphalts for using in roofing applications have different requirements than asphalts for using in roads. Road asphalts typically fail due to low temperature cracking, repeated loading that can result in rutting and fatigue cracking, and water penetration that can result in physical damage due to repeated freeze/thaw cycles. In contrast, roofing asphalts typically fail due to thermal shock caused by repeated heating and cooling cycles, low temperature cracking and loss of aggregate due to flow.

When used in roofing applications, conventional asphalt compositions obtained through oxidation of asphalt which meets ASTM-D-946, ASTM-D-3381 or ASTM D-6373 specifications have limited flexibility and weatherability, causing early failure of roofing shingles. Accordingly, while similar parameters may be used to classify a roofing asphalt and a paving asphalt, e.g., penetration, viscosity, softening point, and the like, the specification for a paving asphalt is different to the specification for a roofing asphalt.

Using a particular crude oil, only certain grades of asphalt may be obtained. The asphalt grade which may be obtained will depend, inter alia, upon the processes used to prepare the asphalt and the additives which are included.

One additive that has been suggested for use in the preparation of asphalt is waste rubber products, such as tires or tubes. Incorporating waste rubber products into asphalt would allow the rubber to be recycled. However, there are a number of significant obstacles related to such use. Scrap tires contain different types of vulcanized rubber, for example polyisoprene, polybutadiene, styrene-butadiene, butyl, ethylene-propylene-diene, as well as fillers, plasticizers, surfactants and the like. Moreover, tires typically contain a significant number of different elastomers. Accordingly, waste rubber is not a single chemical compound but is a mixture of various compounds, the composition of which can vary from one tire to another.

Furthermore, because of the cross-linking of the polymeric material that takes place by the vulcanization process with sulfur or polymeric sulfur derivatives, ground rubber or crumb rubber does not disintegrate readily. The additional chemical bonds created during this vulcanization render impossible the complete dissolution of the polymer in hot bitumen, thus causing problems of stability of the material.

In addition, mixtures of bitumen and rubber are not homogeneous and form two phases of different density which are partially dispersed in one another. The system tends to decant and causes the upper layers, which have a lower density, to be constituted of polymer, while the lower layers, which have a higher density, are constituted of bituminous material. Therefore, if natural rubber or "polymers" are used, they will constitute part of the lower density layer and will thus accumulate at the surface. Crumb rubber, having a higher density (e.g., 1,200 kg/m$^3$), will typically sink to the bottom of the reaction vessel. In cases where crumb rubber is used, the bituminous material will be part of a middle layer interposed between the polymer layer floating at the surface and the crumb rubber making-up the bottom layer.

Attempts have been made to mix bitumen with a wide range of polymers for various applications including roofing and paving. Such polymers include atactic polypropylene (APP) and styrene block copolymers (SBS) (e.g., styrene-butadiene-styrene (SEBS), styrene-isoprene-styrene (SIS), and styrene-ethylene-butadiene-styrene block copolymers (SEBS)). Unfortunately, it takes a relatively long time to process or dissolve the above-mentioned polymers in bituminous materials such as bitumen or various asphalt compositions. Further, these polymer modifiers can be degraded or aged by heat, UV light, weather or a combination thereof.

Attempts have also been made to mix rubbers such as ethylene propylene diene monomer (EPDM) with asphalts. See, e.g., U.S. Pat. Nos. 4,069,181; 4,738,997 and EP Patent Nos. 0338336 A1; and 0093500 A1. Additional rubber compositions are described in U.S. Pat. Nos. 3,873,483; 4,129,542; 6,414,056; U.S. Publication Nos. 2006/0243163; 2006/0249049; and European Application No. EP 0775719 A2. Unfortunately, the mixing often proves difficult.

U.S. Pat. No. 5,501,730 claims a process for producing a homogeneous asphalt composition. While these asphalt compositions may be suitable for various uses, it would be beneficial to provide a roofing asphalt composition having a longer life and improved weatherability.

SUMMARY

The present disclosure broadly relates to an asphalt composition suitable for roofing applications which is prepared from a paving grade asphalt. It has surprisingly been determined that, starting from a paving grade as a roofing grade asphalt may be prepared and that such roofing asphalts may include rubber/elastomer.

In an aspect, the present disclosure relates to a roofing asphalt composition comprising an oxidized blend of a paving grade asphalt and recycled rubber. In an embodiment, the composition comprises from 60 to 99% by weight of the paving grade asphalt; and from 1 to 40% by weight of the recycled rubber. In yet a further embodiment, the composition comprises from 80 to 95% by weight of the paving grade asphalt; and from 5 to 20% by weight of the recycled rubber.

In an embodiment, the roofing asphalt composition comprises a generally uniform mixture of recycled rubber and paving grade asphalt. In yet a further embodiment, the recycled rubber and the paving grade asphalt comprise a homogenized blend. Though it is understood that the term "homogenize" refers to a uniform mixture of elements, as used herein, the term "homogenize" is intended to generally refer to a somewhat uniform mixture of components of the roofing asphalt composition.

In an embodiment, the roofing asphalt composition comprises a recycled rubber comprising at least one of a natural rubber and a synthetic rubber. In yet a further embodiment, the recycled rubber is at least partially vulcanized. In yet a further embodiment, the recycled rubber is obtained from waste tires or tubes.

In an embodiment, at least some of the synthetic rubber selected from the group consisting of styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile.

In an embodiment, the roofing asphalt composition further comprises from 0.01% to 20% by weight of fluxing oil and optionally from 2% to 8% by weight of the fluxing oil.

In an embodiment, the roofing asphalt composition further comprises from 0.01% to 3% by weight of an acid catalyst and optionally from 0.1% to 0.5% by weight of the acid catalyst.

In a further embodiment, the acid catalyst comprises a Lewis acid. In yet a further embodiment, the acid catalyst is selected from phosphorous pentoxide, phosphoric add, chlorides of zinc, chlorides of iron, chlorides of copper; chlorides of antimony, chlorides of aluminum, zinc sulphate, aluminum sulphate, carbonates, bicarbonate salts of sodium, calcium, magnesium, barium, strontium, lithium, ammonium, potassium, bismuth, lead, tetraalkylophosphonium, tetraarylphosphonium, tetraalkylammonium, trialkylammonium and dialkylammonium, transition metals, halides of transition metals, rare earth metals, boron trifluoride, lead oxide, lead naphthenate and sulphur. Optionally, the acid catalyst may be selected from the group consisting of phosphoric acid, phosphorous pentoxide, ferric chloride and ferrous chloride. Optionally, the acid catalyst may comprise ferrous chloride and/or ferric chloride.

In an embodiment, the roofing asphalt composition further comprises a petroleum fraction. In yet a further embodiment, the petroleum fraction comprises a light or medium cycle oil and comprises from 2.0 to 20% by weight of the composition.

In an embodiment, the roofing asphalt composition further comprises an elastomer. In yet a further embodiment, the elastomer comprises from 0.01 to 5.0% by weight of the composition. Non-limiting examples of elastomers include styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile.

In another aspect, the present disclosure relates to a catalytic process for preparing a roofing asphalt composition, the process comprising:
(a) catalytically oxidizing a paving grade asphalt and recycled rubber particles at a temperature ranging from about 200° to about 300° C. and obtaining a catalytically oxidized mixture;
(b) homogenizing the catalytically oxidized mixture; and
(c) recovering the asphalt composition.

In an embodiment of the catalytic process, the recycled rubber particles have a thickness of up to 1 cm.

In an embodiment, the catalytic process further comprises adding a fluxing oil prior to or during the homogenizing step. In a further embodiment the fluxing oil is added prior to or during step (a).

In an embodiment, the catalytic process further comprises selecting at least a portion of the recycled rubber from at least one of a natural rubber and a synthetic rubber.

In an embodiment, the catalytic process further comprises selecting the recycled rubber from at least partially vulcanized natural rubber and synthetic rubber. In an embodiment wherein the process comprises at least partially vulcanized rubber, the catalytic oxidation is conducted for a time to effect at least a partial devulcanization of the rubber.

In an embodiment, the catalytic process further comprises selecting at least a portion of the synthetic rubber from the group consisting of styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile.

In an embodiment, the catalytic process further comprises obtaining at least a portion of the recycled rubber from waste tires or tubes.

In an embodiment of the catalytic process, the catalytic oxidation is conducted in the presence of an acid catalyst. In a further embodiment, the amount of acid catalyst ranges from 0.01% to 3% by weight of the composition and optionally from 0.05 to 1% by weight of the asphalt composition. In yet a further embodiment, the acid catalyst comprises a Lewis acid. In yet a further embodiment, the acid catalyst is selected from phosphorous pentoxide, phosphoric acid, chlorides of zinc, chlorides of iron, chlorides of copper, chlorides of antimony, chlorides of aluminum, zinc sulphate, aluminum sulphate, carbonates, bicarbonate salts of sodium, calcium, magnesium, barium, strontium, lithium, ammonium, potassium, bismuth, lead, tetraakylophosphonium, tetraarylphosphonium, tetraalkylammonium, trialkylammonium and dialkylammonium, transition metals, halides of transition metals, rare earth metals, boron trifluoride, lead oxide, lead naphthenate and sulphur. Optionally, the acid catalyst may be selected from the acid catalyst from the group consisting of phosphoric acid, phosphorous pentoxide, ferric chloride and ferrous chloride. Optionally, the acid catalyst may be selected from ferrous chloride and/or ferric chloride.

In an embodiment, the catalytic process further comprises introducing pressurized air during the catalytic oxidation step. In yet a further embodiment of the catalytic process, the catalytic oxidation is conducted at a pressure of from about 0 (atmospheric pressure) to 50 psig. In yet a further embodiment of the catalytic process, the catalytic oxidation is conducted for 1 to 20 hours.

In an embodiment, the catalytic process further comprises combining the paving grade asphalt and the recycled rubber particles at temperatures ranging from about 160° C. to about 200° C. to produce a generally uniform suspension of the particles in the asphalt that is subjected to the catalytic oxidation.

In an aspect, the present disclosure relates to the use of an asphalt composition comprising an oxidized blend of a paving grade asphalt and recycled rubber for roofing applications. The asphalt composition may be according to any one or more of the embodiments disclosed herein.

In an aspect, the present disclosure relates to a roofing product comprising an asphalt composition comprising an oxidized blend of a paving grade asphalt and recycled rubber. The asphalt composition may be according to any one or more of the embodiment disclosed herein.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

The drawings included, herewith are for illustrating various examples of articles, methods, and apparatuses of the teaching of the present specification and are not intended to limit the scope of what is taught in any way.

DETAILED DESCRIPTION

I. Glossary

Figure 1:
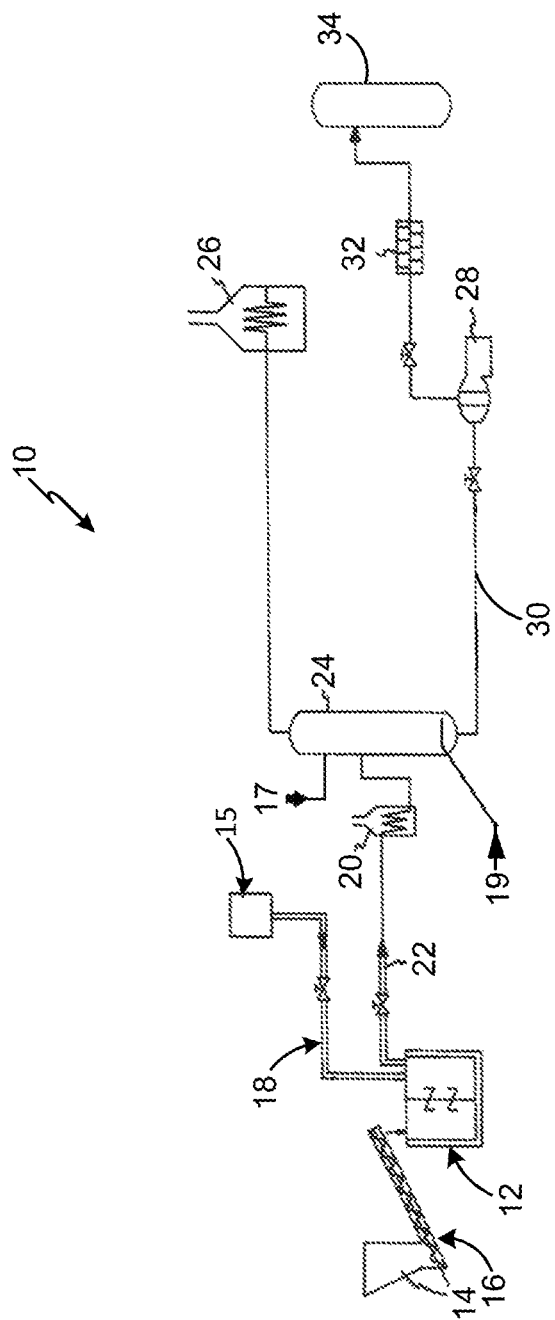
FIG. 1 is a schematic drawing of an embodiment of a system suitable for carrying out the catalytic process of the present disclosure; and, FIG. 2 is a schematic drawing of a further embodiment of a system suitable for carrying out the catalytic process of the present disclosure.

In order to provide a clear and consistent understanding of the terms used in the present specification, a number of definitions are provided below. Moreover, unless defined otherwise, all technical and scientific terms as used herein have the same meaning as commonly understood by one of ordinary skill in the art to which this specification pertains.

The word "a" or "an" when used in conjunction with the term "comprising" in the claims and/or the specification may mean "one", but it is also consistent with the meaning of "one or more", "at least one", and "one or more than one" unless the content clearly dictates otherwise. Similarly, the word "another" may mean at least a second or more unless the content clearly dictates otherwise.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and, any form of containing, such as "contain" and "contains"), are inclusive or open-ended and do not exclude additional, unrecited elements or process steps.

As used in this specification and claim(s), the word "consisting" and its derivatives, are intended to be close ended terms that specify the presence of stated features, elements, components, groups, integers, and/or steps, and also exclude the presence of other unstated features, elements, components, groups, integers and/or steps.

The term "consisting essentially of", as used herein, is intended to specify the presence of the stated features, elements, components, groups, integers, and/or steps as well as those that do not materially affect the basic and novel characteristic(s) of features, elements, components, groups, integers, and/or steps.

The terms "about", "substantially" and "approximately" as used herein mean a reasonable amount of deviation of the modified term such that the end result is not significantly changed. These terms of degree should be construed as including a deviation of at least ±1% of the modified term if this deviation would not negate the meaning of the word it modifies.

The term "suitable" as used herein means that the selection of the particular material or conditions would depend on the specific synthetic manipulation to be performed, and the identity of the material(s) to be transformed, but the selection would be well within the skill of a person trained in the art. All process/method steps described herein are to be conducted under conditions sufficient to provide the product shown. A person skilled in the art would understand that all reaction conditions, including, for example, reaction time, reaction temperature, reaction pressure and reactant ratio, can be varied to optimize the yield of the desired product and it is within their skill to do so.

The expression "proceed to a sufficient extent" as used herein with reference to the reactions or process steps disclosed herein means that the reactions or process steps proceed to an extent such that conversion of the starting material or substrate to product is maximized. Conversion may be maximized when greater than about 5, 10, 15, 20, 25, 30, 35, 40, 45, 50, 55, 60, 65, 70, 75, 80, 85, 90, 95 or 99% of the starting material or substrate is converted to product.

The term "composition" as used herein, includes a mixture of materials which comprise the composition, as well as reaction products and decomposition products formed from the materials of the composition.

The term "waterproofing" as used herein, refers to the process of making a building component (e.g. a roofing component) resistant to the passage of water and/or water vapor.

Further, the definitions and embodiments described in particular sections are intended to be applicable to other embodiments herein described for which they are suitable as would be understood by a person skilled in the art. For example, in the following passages, different aspects of the invention are defined in more detail. Each aspect and embodiment so defined may be combined with any other aspect or aspects or embodiment or embodiments unless clearly indicated to the contrary. In particular, any feature indicated as being preferred or advantageous may be combined with any other feature or features indicated as being preferred or advantageous.

In an embodiment, the present disclosure relates to a roofing asphalt composition that is characterized by significantly improved weatherability characteristics. The roofing asphalt compositions of the present disclosure comprise an oxidized blend of a paving grade asphalt and recycled rubber. In an embodiment, the recycled rubber comprises at least one of a natural rubber and a synthetic rubber. In a further embodiment, at least a portion of the recycled rubber is at least partially vulcanized. In yet a further embodiment, at least some of the recycled rubber is obtained from waste tires or tubes. In particular embodiments of the present disclosure, at least some of the synthetic rubber is selected from the group consisting of styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile. The amount and ratio of paving grade asphalt and, recycled rubber will depend on the desired physical and mechanical properties of the final asphalt composition.

In an aspect, the roofing asphalt compositions of the present disclosure exhibit improved temperature and UV stabilities. In further embodiments, the roofing asphalt compositions disclosed herein exhibit improved weatherability. In yet a further aspect, the use of recycled rubber reduces manufacturing costs.

In an aspect, the present disclosure relates to methods of using the compositions in various roofing applications such as but not limited to waterproofing shingles, sheets or membranes for roofs.

In an aspect, the present disclosure relates to articles comprising at least one component formed from the compositions disclosed herein.

Methods for Preparing Roofing Asphalt Compositions

In one of its embodiments, the present disclosure includes a catalytic process for preparing a roofing asphalt composition, the process comprising:

(a) optionally combining paving grade asphalt and recycled rubber particles at temperatures ranging from about 160° C. to about 200° C. to produce a generally uniform suspension of the particles in the asphalt;
(b) catalytically oxidizing the suspension at a temperature ranging from about 200° to about 300° C. and obtaining a catalytically oxidized mixture;
(c) homogenizing the catalytically oxidized mixture; and,
(d) recovering the asphalt composition.

The process may be conducted using any equipment known in the art. FIG. 1 illustrates a schematic of an embodiment, referred to as system 10, suitable for the catalytic preparation of the roofing asphalt composition of the present disclosure. As exemplified, paving grade asphalt and recycled rubber particles are combined in a reactor, such as stirred tank or mixer 12. The paving grade asphalt and recycled rubber particles may be added concurrently or sequentially in any order and may be added by the same stream or different streams. For example, as exemplified, recycled rubber particles are introduced into mixer 12 from, e.g., dispenser 14 via conveyor 16, while asphalt (bitumen) is introduced into the mixer from tank 15 via pipe 18.

The paving grade asphalt may be any asphalt (as defined in ASTM D-1079) or mixture thereof that would have a PEN (ASTM D-5) greater than 40 dmm, or that would have a viscosity (ASTM D-2171) of less than 500 Pa·S (Pascal-seconds) at 60° C. [140° F.]. In an embodiment of the present disclosure, the paving grade asphalt may comprise, consist essentially of or consist of one or more paving grade asphalts having a PEN (ASTM D-5) falling within the Penetration Graded Asphalt cement of ASTM D-946; one or more paving grade asphalts (as defined in ASTM D-1079) that have a viscosity (ASTM D-2171) falling within the Viscosity Graded asphalt cement of ASTM D-3381; and/or one or more paving grade asphalts (as defined in ASTM D-1079) that would have a Dynamic Shear, G*/sin δ value [determined by either ASTM-7175 or AASHTO T-315] above 1.00 kilopascal at any temperature above 46° C. In a further embodiment of the present disclosure, the paving grade asphalt may comprise, consist essentially of or consist of one or more paving grade asphalts that meet one of the paving asphalt grades 150/200 PEN, 85/100 PEN, 60/70 PEN, AC-10, AC-20, AC-30, PG58-28, PG64-22 and PG67-22.

The final roofing asphalt may comprise from 60 to 99% by weight of the paving grade asphalt. In non-limiting embodiments, for example, the paving grade asphalt may comprise, for example, 60, 65, 70, 75, 80, 85, 90, 95 or 99% by weight of the roofing asphalt composition, or any range or integer derivable therein The recycled rubber particles may be any rubber material covered under either ASTM D-5603 or ASTM D-6114. The final roofing asphalt may comprise from 1 to 40% by weight of the recycled rubber particles. In non-limiting embodiments, for example, the recycled rubber particles may comprise, for example, 1, 5, 10, 15, 20, 25, 30, 35 or 40% by weight of the roofing asphalt composition, or any range or integer derivable therein.

Mixer 12 may be operated so as to produce a generally uniform mixture. For example, the paving grade asphalt and recycled rubber particles may be mixed at an elevated temperature for a sufficient amount of time to generally uniformly distribute the recycled rubber particles in the paving grade asphalt. It will be appreciated that the amount of time will vary depending, inter alia, upon the starting temperature of the paving grade asphalt and recycled rubber particles prior to their introduction to mixer 12, the temperature of the mixture in mixer 12, the degree of agitation that is provided (e.g., the rpm of a stirrer 12b in mixer 12 and the size of the recycled rubber particles introduced to mixer 12.

Optionally, the temperature of the mixture in mixer 12 is maintained at about 160° C. to about 200° C. and the mixture remains therein under agitation until the rubber particles are generally uniformly suspended in the asphalt. For example, the mixture may be agitated in mixer 12 for a period of time varying, e.g., from 30 minutes to 3 hours, at a temperature of, e.g., 160°-180° C., depending on the starting materials and the properties required for the asphalt composition.

The resulting suspension may then be catalytically oxidized. Accordingly, the resulting suspension may be transferred directly to a reactor 24. However, if the resulting suspension is not at a desired temperature for introduction to reactor 24, it may be subjected to additional heating prior to introduction to reactor 24, and/or stored, e.g., in a holding tank (not shown).

The use of mixer 12 results in the "wetting" of the rubber in preparation for introduction into reactor 24. As the rubber particles are mixed in the asphalt, the rubber particles commence exuding oils that can lower the flash point. A lower flash point may result in unsafe conditions being present for the catalytic oxidation step. Using mixer 12 enables these oils to be exuded and removed if needed to prevent excessive lowering of the flash point. If the flash point is not a concern, then the combining step may be omitted. In such a case, the components may be added directly to reactor 24.

As exemplified in FIG. 1, the resulting suspension is transferred via pipe 22 into heat exchanger 20, wherein the temperature may be further raised, to about 230° C. Heat exchanger 20 may be an indirect heat exchanger and may operate counter currently using waste heat, e.g., in the form of a heated fluid stream, such as tail gas or wet steam, that is available at the site.

The suspension is subsequently transferred into a reactor 24 where it is catalytically oxidized. The catalytic oxidation may be conducted at an elevated temperature and/or pressure for a sufficient amount of time to produce an asphalt composition meeting the specification for a selected roofing grade asphalt. It will be appreciated by a person skilled in the art that the catalytic oxidation may occur in one step or more than one step.

The rubber employed in the manufacture of tires and tubes is typically vulcanized, that is, the polymer chains are crosslinked by sulfur bridges, with the result that the physical properties of the rubber material thus treated are improved while its elasticity is maintained. To be suitable for the purposes of the present invention, such waste rubber is treated to be at least partially devulcanized. In an embodiment of the present disclosure, devulcanization is accomplished by catalytic oxidation at an elevated temperature and pressure.

Figure 2:
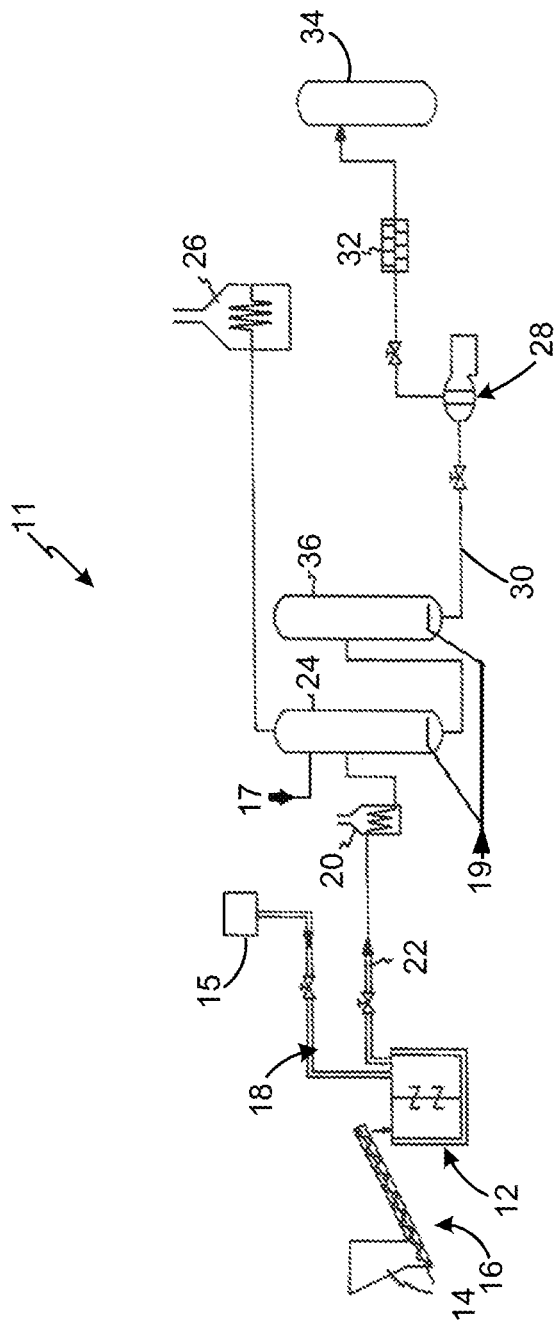

The catalytic oxidation may be conducted over a period of time ranging from 1 to 20 hours. The oxidation times will vary based on the nature of the paving grade asphalt and recycled rubber introduced into the reactor, the degree of devulcanization of the rubber, the selected grade of the roofing asphalt that is to be produced and the pressure and temperature at which the catalytic oxidation is conducted. A second reactor 36, in fluid communication with the first reactor 24, may be incorporated into the catalytic process where longer oxidation periods are required (see system 11 in FIG. 2). In such a case, the asphalt may be catalytically oxidized to a first degree in first reactor 24 and may be further catalytically oxidized in second reactor 36. An advantage of system 11 resides in the fact that larger volumes of asphalt composition can be produced over a given period of time. In non-limiting embodiments, for example, the catalytic oxidation may be performed, for example, for at least 1 hour, 2 hours, 3 hours, 4 hours, 5 hours, 6 hours, 7 hours, 8 hours, 9 hours, 10 hours, 11 hours, 12 hours, 13 hours, 14 hours, 15 hours, 16 hours, 17 hours, 18 hours, 19 hour or 20 hours or any range or integer derivable therein.

The catalyst and oxygen may be introduced into reactor 24 by any means known in the catalytic oxidation arts. As exemplified, reactor 24 is equipped separate inlets for the introduction of the catalyst and oxygen. Inlet 17 is provided for the introduction of the catalyst and inlet 19 is provided for the injection of a pressurized oxygen containing gas, such as air, oxygenated air or oxygen. Inlets 17 and 19 may be located at any location on reactor 24. Optionally, the pressurized oxygen containing gas is advantageously injected through an inlet located near the bottom of reactor 24 to maximize mixing of the pressurized air with the suspension. In an alternate embodiment of the present disclosure, the catalyst and the pressurized gas may be introduced into reactor 24 through the same inlet.

Reactor 24 may be operated at temperatures ranging from about 200° C. to about 300° C., optionally 210° C. to 290° C., optionally 220° C. to 280° C., and optionally 230° C. to 260° C. The oxidation temperatures will vary based on the nature of the paving grade asphalt and recycled rubber introduced into the reactor, the degree of devulcanization of the rubber, the selected grade of the roofing asphalt that is to be produced, the pressure at which the catalytic oxidation is conducted and the duration of the catalytic oxidation process. In non-limiting embodiments, for example, the catalytic oxidation may be performed, for example, at a temperature of 205° C., 210° C., 215° C., 220° C., 225° C., 230° C., 235° C., 240° C., 245° C., 250° C., 255° C., 260° C., 265° C., 270° C., 275° C., 280° C., 285° C., 290° C., 295° C. or 300° C. or any range or integer derivable therein.

Reactor 24 may be operated at pressures ranging from 0 to 50 psig. It is to be noted that the pressure could be higher depending on the height of reactor 24. In non-limiting embodiments, for example, the catalytic oxidation may be performed, for example, at pressures ranging from 5 to 40 psig or 5 to 30 psig. The oxidation pressures will vary based on the nature of the paving grade asphalt and recycled rubber introduced into the reactor, the degree of devulcanization of the rubber, the selected grade of the roofing asphalt that is to be produced, the temperature at which the catalytic oxidation is conducted and the duration of the catalytic oxidation process. In non-limiting embodiments, for example, the catalytic oxidation may be performed, for example, at a pressure of 10, 15, 20, 25, 30, 35, 40, 45 or 50 psig or any range or integer derivable therein.

The catalyst may be an acid catalyst. The amount of acid catalyst may range from 0.01% to 3% dry catalyst based on the total weight of the composition. In non-limiting embodiments, for example, the amount of catalyst may be at least about 0.0150%, 0.0200%, 0.0225%, 0.0250%, 0.0275%, 0.0300%, 0.0325%, 0.0350%, 0.0375%, 0.0400%, 0.0425%, 0.0450%, 0.0475%, 0.0550%, 0.0575%, 0.0600%, 0.0625%, 0.0650%, 0.0675%, 0.0700%, 0.0725%, 0.0750%, 0.0775%, 0.0800%, 0.0825%, 0.0850%, 0.0875%, 0.0900%, 0.0925%, 0.0950%, 0.0975%, 0.1000%, 0.1250%, 0.1500%, 0.1750%, 0.2000%, 0.2250%, 0.2500%, 0.2750%, 0.3000%, 0.3250%, 0.3500%, 0.3750%, 0.4000%, 0.4250%, 0.4500%, 0.4750%, 0.5000%, 0.5250%, 0.550%, 0.5750%, 0.6000%, 0.6250%, 0.6500%, 0.6750%, 0.7000%, 0.7250%, 0.7500%, 0.7750%, 0.8000%, 0.8250%, 0.8500%, 0.8750%, 0.9000%, 0.9250%, 0.9500%, 0.9750%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9% or 3.0% or any range or integer derivable therein.

The catalyst may be any of those disclosed in U.S. Pat. Nos. 1,782,186, 2,450,756, 2,375,117 and 2,649,584, the disclosure of each of which is incorporated herein by reference. Further, the catalyst may be one of those disclosed in European Patent Application Number 0053041, the disclosure of each of which is incorporated herein by reference.

The acid catalyst may comprise, consist essentially of or consist of a Lewis acid.

The acid catalyst may be selected from phosphorous pentoxide, phosphoric acid, chlorides of zinc, chlorides of iron, chlorides of copper, chlorides of antimony, chlorides of aluminum, zinc sulphate, aluminum sulphate, carbonates, bicarbonate salts of sodium, calcium, magnesium, barium, strontium, lithium, ammonium, potassium, bismuth, lead, tetraalkylophosphonium, tetraarylphosphonium, tetraalkylammonium, trialkylammonium and dialkylammonium, transition metals, halides of transition metals, rare earth metals, boron trifluoride, lead oxide, lead naphthenate, sulphur and mixtures thereof.

Alternately, the acid catalyst may be selected from the group consisting of phosphoric acid, phosphorous pentoxide, ferric chloride, ferrous chloride and mixtures thereof.

Alternately, the acid catalyst may comprise, consist essentially of or consist of ferrous chloride, ferric chloride and mixtures thereof.

The catalytic oxidation will produce a tail gas. The tail gas may be recycled in whole or in part and/or it may be released into the atmosphere. Optionally, the tail gas is conveyed by a pipe 25, to a tail gas treatment unit wherein the tail gas may be cleaned or purified, e.g., by air filter or purifier 26 before being released into the atmosphere.

The oxidized mixture may then be homogenized using any means known in the art or it may be stored prior to being homogenized. Homogenization provides stability of the composition during extended periods of storage. As exemplified, the oxidized mixture is transferred into dispersing device 28 through pipe 30, to homogenize the oxidized mixture. The dispersing device 28 may comprise a pair of mating toothed discs turning at a speed of, e.g., about 3600 RPM. Operation of a homogenizer at such high speeds assist in continued catalytic oxidation of the composition. In an alternate embodiment of the present disclosure, the oxidized mixture is homogenized using a high shear mixer or mill.

The homogenized mixture may optionally be subjected to a static mixer 32 (e.g., by being conveyed through a static mixer). The static mixer further enhances the degree of homogenization produced by dispersing device 28.

The homogenized mixture may then be used or stored until required. As exemplified, the homogenized mixture is conveyed from static mixer to storage container 34. The storage temperature in container 34 typically ranges from about 170° C. to about 260° C.

System 10 and the associated catalytic process provides for an asphalt composition suitable for roofing applications. Various adjustments of the operational conditions (e.g. temperature, pressure, time in the reactor, ratio of ingredients etc.), to obtain the desired physical properties/characteristics of the roofing asphalt, may be selected by a person of skill in the art.

A fluxing oil may be added during the process, such as prior to or during the step of combining the paving grade asphalt and recycled rubber particles (e.g., fluxing oil may be added by a separate stream into mixer 12 and/or fluxing oil may be added to one or both of the paving asphalt and rubber particles prior to their introduction to mixer 12), during the step of homogenizing the catalytically oxidized mixture (e.g., fluxing oil may be added to dispersing device 28 and/or static mixer 32) and/or by adding fluxing oil to the catalytically oxidized mixture and prior to homogenizing the catalytically oxidized mixture (e.g., fluxing oil may be added to the catalytically oxidized asphalt prior to introduction to dispersing device 28 and/or static mixer 32). The fluxing oil may be a light or medium cycle oil obtained from the distillation of oil. The fluxing oil may be a re-refined heavy vacuum distillation bottom The fluxing oil is utilized to adjust the consistency of the asphalt and the amount which is added may be adjusted to produce a desired grade of roofing asphalt. The fluxing oil may comprise from 0.01% to 20%, 2% to 8% by weight of the asphalt composition. In non-limiting embodiments, for example, the fluxing oil may comprise, for example, 1, 2, 3, 4, 5, 6, 7, 8, 9, 10, 11, 12, 13, 14, 15, 16, 17, 18, 19 or 20% by weight of the asphalt composition, or any range or integer derivable therein.

Polymeric elastomers, non-limiting examples of which include styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile may be added to improve the elongation properties and elasticity of the final asphalt compositions. The amount of elastomer may range from about 0.01 to about 5.0% by weight of the composition and depends on the desired physical and mechanical properties of the roofing asphalt.

The resulting roofing asphalt may be any roofing asphalt (as defined in ASTM D-1079) that would have a softening point (ASTM D-36) higher than 50° C. and PEN at 25° C. (ASTM D-5) between 5 and 70 dmm. In an alternate embodiment of the present disclosure, the resulting roofing asphalt may be any roofing asphalt (as defined in ASTM D-1079) that would have a softening point (ASTM D-36) higher than 80° C. and PEN at 25° C. (ASTM D-5) between 5 and 40 dmm. In an alternate embodiment of the present disclosure, the resulting roofing asphalt may be any roofing asphalt (as defined in ASTM D-1079) that would fall within the Standard Specification for Asphalt Used in Roofing (ASTM D-312).

The catalytic process of the present disclosure is both efficient and economical as it relies on recycled rubber as one of its ingredients. Moreover, the relatively short reaction times result in a very limited production of degradation products further ensuring the quality of the final asphalt composition. Furthermore, the catalytic process of the present disclosure may result in reduced levels of liquid or solid wastes making it suitable to large scale production.

It will be appreciated that standard additives, such as a UV stabilizer, may be added to the roofing asphalt.

The rheological and mechanical properties of the asphalt compositions of the present disclosure, as referred to in the examples, and more particularly in Table 1 are as follows:

PEN: penetration is measured by the standardized procedure ASTM-D5; Softening Points are measured by the ring and ball method ASTM-D36; Viscosity is measured using ASTM D4402; Accelerated aging using a Weather-O-meter is measured according to ASTM 04798; Flash Points are measured by ASTM D92; Storage Stabilities are measured using ASTM D7173; Elasticity, Resilience and Ductility tests were performed under the current standard methods fixed by the ASTM Committee; and Stain Indexes are measured by standardized procedure ASTM D2746.

A number of representative non-limiting examples are provided herein below illustrating the preparation of various roofing asphalt compositions in accordance with the present disclosure. It should be noted that the expression "crumb rubber" cited in the examples, refers to rubber obtained from waste tires or tubes.

EXAMPLE 1

Samples S00531, S00532, S00533 and S00535

A mixture of asphalt PG 64-22 or an equivalent (2550 g) and crumb rubber from recycled passenger tires (450 g-30 mesh) is heated to 200-260° C. under pressurized air in a reactor equipped with a mechanical mixer. After 4 hours, the resulting mixture is removed from the reactor and any residual crumb rubber is further reduced using a high shear mixer. Selected physical properties of the resulting asphalt compositions are illustrated in Table 1.

EXAMPLE 2

Samples S00608, S00609, S00610 and S00611

A mixture of asphalt PG 64-22 (2239.5 g), crumb rubber from recycled passenger tires (450 g-30 mesh), a fluxing oil, namely asphalt extender from re-refined heavy vacuum distillation bottoms (300 g) and ferrous chloride (10.5 g) is heated to 200-260° C. under pressurized air in a reactor equipped with a mechanical mixer. After 3 hours, the resulting mixture is removed from the reactor without subsequent homogenization. Selected physical properties of the resulting asphalt compositions are also illustrated in Table 1.

A coating sample was subjected to accelerated weathering in Atlas Weather-O-meter Ci4000 according to ASTM D 4798, cycle A.

Samples S00531, 500532, S00533, S00535, S00537 and S00643 are comparative examples that were run without a catalyst. As set out in Table 1, samples S00531, S00532, S00533, S00535, 800537 and S00643 illustrate that, in absence of a catalyst, regardless of the source of the paving asphalt, the oxidized composition had a penetration less than 15 dmm for PEN, even before the softening point reached 100° C.

Samples S00655 and S00657 illustrate that catalytic oxidation of an appropriate paving grade asphalt may produce a roofing asphalt with acceptable PEN results. However, in the absence of crumb rubber, the weatherability results are poor.

Samples S00608, S00609, S00610, S00611 and S00644 illustrate that the presence of both catalyst and crumb rubber result in the production of a roofing asphalt exhibiting good characteristics.

It should be noted that the presence of a filler is not required and was merely used to qualify the weathering test.

While the present disclosure has been described with reference to what are presently considered to be the preferred examples, it is to be understood that the disclosure is not limited to the disclosed examples. In particular, what has been described herein has been intended to be illustrative and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

All publications, patents and patent applications are herein incorporated by reference in their entirety to the same extent as if each individual publication, patent or patent application was specifically and individually indicated to be incorporated by reference in its entirety.

TABLE 1

Selected Physical Properties for Various Roofing Asphalt Compositions in Accordance with Various Embodiments of the Present Disclosure.

| CODE | Oxidation Date | TBA | Pen | Paving Grade | Supplier Source | Fluxing Oil | Crumb Rubber | Catalyst | Filler | weathering | Comments |
|---|---|---|---|---|---|---|---|---|---|---|---|
| S00531 | Jun. 8, 2011 | 93.5 | 10.3 | 85% PG64-22 | "A" | None | 15% of 30 mesh | None | 69% | 2000 | Failed PEN <15 |
| S00532 | Jun. 9, 2011 | 93.0 | 8.7 | 85% PG64-22 | "B" | None | 15% of 30 mesh | None | 69% | 2000 | Failed PEN <15 |
| S00533 | Jun. 10, 2011 | 96.0 | 6.7 | 85% PG64-22 | "C" | None | 15% of 30 mesh | None | 69% | 2000 | Failed PEN <15 |
| S00535 | Jun. 14, 2011 | 107.0 | 6.0 | 85% PG64-22 | "C" | None | 15% of 30 mesh | None | 69% | 2000 | Failed PEN <15 |
| S00537 | Jun. 21, 2011 | 96.0 | 8.3 | 85% PG64-22 | "D" | None | 15% of 30 mesh | None | 69% | 2000 | Failed PEN <15 |
| S00608 | May 24, 2012 | 100.0 | 22.7 | 74.65% PG64-22 | "D" | 10% RHVDB | 15% of 30 mesh | 0.35% FeCl2 | 69% | 4000 | Excellent |
| S00609 | May 28, 2012 | 98.0 | 23.7 | 74.65% PG64-22 | "A" | 10% RHVDB | 15% of 30 mesh | 0.35% FeCl2 | 69% | 2800 | Acceptable |
| S00610 | May 29, 2012 | 103.5 | 21.7 | 74.65% PG64-22 | "B" | 10% RHVDB | 15% of 30 mesh | 0.35% FeCl2 | 69% | 5600 | Excellent |
| S00611 | May 31, 2012 | 93.5 | 31.0 | 74.65% PG64-22 | "E" | 10% RHVDB | 15% of 30 mesh | 0.35% FeCl2 | 69% | 4000 | Excellent |
| S00643 | Apr. 25, 2013 | 108.5 | 4.7 | 80% PG64-22 | "A" | 10% RHVDB | 10% of 30 mesh | None | 69% | 4000 | Failed PEN <15 |
| S00644 | Apr. 29, 2013 | 100.0 | 16.0 | 79.65% PG64-22 | "A" | 10% RHVDB | 10% of 30 mesh | 0.35% FeCl2 | 69% | 2800 | Acceptable |
| S00655 | May 22, 2013 | 100.0 | 16.0 | 67.25% PG64-22 22.4% 150/200 | "A" "F" | 10% RHVDB | None | 0.35% FeCl2 | 69% | 1600 | Poor Weatherability |
| S00657 | May 23, 2013 | 95.5 | 17.0 | 67.25% PG64-22 22.4% Flux | "A" "G" | 10% RHVDB | None | 0,35% FeCl2 | 69% | 1200 | Poor Weatherability |

The invention claimed is:

1. A catalytic process for preparing a roofing asphalt composition, the process comprising:
   (a) catalytically oxidizing a paving grade asphalt and recycled rubber particles at a temperature ranging from about 220° C. to about 300° C. and obtaining a catalytically oxidized mixture;
   (b) homogenizing the catalytically oxidized mixture; and
   (c) recovering the asphalt composition.

2. The catalytic process of claim 1, wherein the catalytic oxidation is conducted in the presence of an acid catalyst.

3. The catalytic process of claim 1, further comprising adding a fluxing oil prior to or during the homogenizing step.

4. The catalytic process of claim 3, wherein the fluxing oil is added prior to or during step (a).

5. The catalytic process of claim 1, further comprising selecting at least a portion of the recycled rubber from at least one of a natural rubber and a synthetic rubber.

6. The catalytic process of claim 1, further comprising selecting the recycled rubber from at least partially vulcanized natural rubber and synthetic rubber.

7. The catalytic process of claim 6, wherein the catalytic oxidation is conducted for a time to effect at least a partial devulcanization of the rubber.

8. The catalytic process of claim 1, further comprising obtaining at least a portion of the recycled rubber from waste tires or tubes.

9. The catalytic process of claim 5, further comprising selecting at least a portion of the synthetic rubber from the group consisting of styrene-butadiene-styrene (SBS), styrene butadiene (SBR), styrene-ethylene/butylene-styrene (SEBS), polyethylene, polyisoprene, polybutylene, polychloroprene (neoprene), nitrile rubber (acrylonitrile butadiene), butyl rubber and polyacrylonitrile.

10. The catalytic process of claim 1, wherein the particles have a thickness of up to 1 cm.

11. The catalytic process of claim 2, wherein the acid catalyst comprises a Lewis acid.

12. The catalytic process according to claim 2, further comprising selecting the acid catalyst from phosphorous pentoxide, phosphoric acid, chlorides of zinc, chlorides of iron, chlorides of copper, chlorides of antimony, chlorides of aluminum, zinc sulphate, aluminum sulphate, carbonates, bicarbonate salts of sodium, calcium, magnesium, barium, strontium, lithium, ammonium, potassium, bismuth, lead, tetraalkylophosphonium, tetraarylphosphonium, tetraalkylammonium, trialkylammonium and dialkylammonium, transition metals, halides of transition metals, rare earth metals, boron trifluoride, lead oxide, lead naphthenate and sulphur.

13. The catalytic process of claim 2, further comprising selecting the acid catalyst from the group consisting of phosphoric acid, phosphorous pentoxide, ferric chloride and ferrous chloride.

14. The catalytic process of claim 13, further comprising selecting the acid catalyst from at least one of ferrous chloride and ferric chloride.

15. The catalytic process of claim 2, wherein the amount of acid catalyst ranges from 0.01 to 3% by weight of the asphalt composition.

16. The catalytic process of claim 15, wherein the amount of acid catalyst ranges from 0.05 to 1% by weight of the asphalt composition.

17. The catalytic process of claim 7, further comprising conducting the catalytic oxidation for 1 to 20 hours.

18. The catalytic process of claim 1, further comprising introducing pressurized air during the catalytic oxidation step.

19. The catalytic process of claim 18, wherein the catalytic oxidation is conducted at a pressure of from about 0 to 50 psig.

20. The catalytic process of claim 1, further comprising combining the paving grade asphalt and the recycled rubber particles at temperatures ranging from about 160° C. to about 200° C. to produce a generally uniform suspension of the particles in the asphalt that is subjected to the catalytic oxidation.

21. The catalytic process of claim 1, wherein the catalytic oxidation is performed at a temperature ranging from about 220° C. to about 280° C.

22. The catalytic process of claim 1, wherein the catalytic oxidation is performed at a temperature ranging from about 230° C. to about 260° C.

* * * * *